Oct. 12, 1954  A. N. STANTON  2,691,222
GAUGE
Filed Feb. 9, 1951
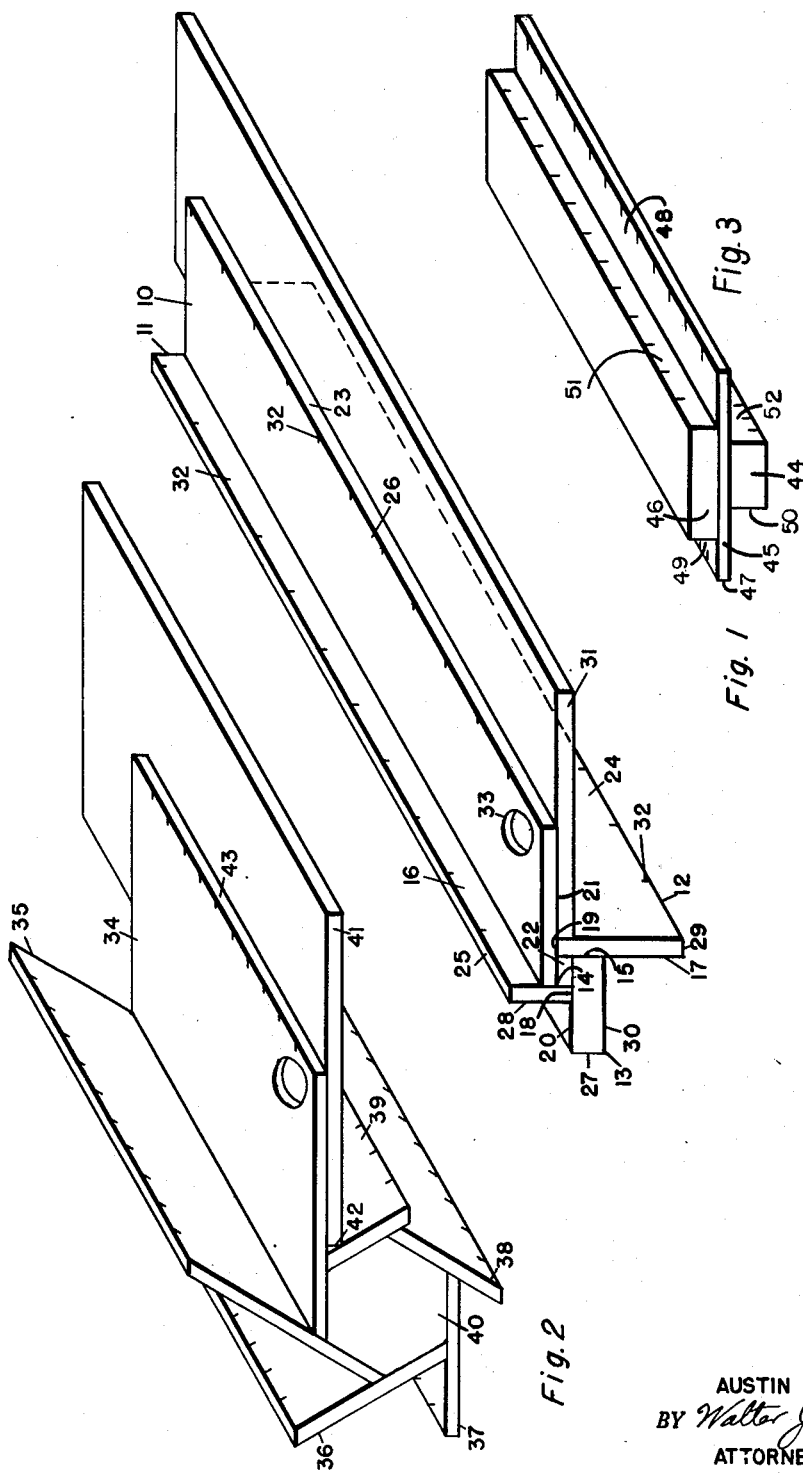
INVENTOR.
AUSTIN N. STANTON
BY *Walter J. Jagmin*
ATTORNEY

Patented Oct. 12, 1954

2,691,222

UNITED STATES PATENT OFFICE 2,691,222

GAUGE

Austin N. Stanton, Garland, Tex.

Application February 9, 1951, Serial No. 210,192

10 Claims. (Cl. 33—90)

This invention relates to gages and more particularly to gages for laying off a line on a piece of work parallel to and a predetermined distance from an edge of the piece of work.

In many manufacturing processes, such as fabrication of articles from sheet metal, it is necessary to lay off a line which is parallel to the edge of a work piece at a predetermined distance from the edge. The edge of the piece of work may then be bent along the line or holes may be drilled at desired points on the line. In practice the line is usually spaced a conventional distance, such as one-eighth inch, three sixteenths inch, one quarter inch and so on, from the edge of the work. It is desirable, therefore, that a gage be provided by means of which lines parallel to the edge of a work piece and spaced a predetermined distance from the edge may be laid off with a minimum expenditure of time and with a maximum accuracy.

Accordingly it is an object of my invention to provide a new and improved gage for laying off a line on a work piece which is parallel to the edge of the piece.

It is another object of my invention to provide a new and improved gage for laying off a line on a piece of work parallel to and a predetermined distance from an edge of the piece.

In the drawing:

Figure 1 is a perspective view illustrating a preferred embodiment of the gage of my invention applied to a piece of work;

Figure 2 is a perspective view illustrating a modification of the gage shown in Figure 1; and, Figure 3 is a perspective view illustrating another modification of the gage shown in Figure 1.

Referring now to Figure 1, the illustrated gage comprises four blades 10, 11, 12 and 13. Two of the blades 10 and 13 extend in parallel spaced planes which are perpendicular to the spaced parallel planes in which extend the other two blades 11 and 12. The ends 14 and 15 of blades 10 and 13, respectively, abut the sides 16 and 17 of blades 11 and 12, respectively, while the ends 18 and 19 of blades 11 and 12 abut the sides 20 and 21 of blades 13 and 10. The ends 14, 15, 18 and 19 abut sides 16, 17, 20 and 21, respectively, intermediate the edges of those sides. Consequently an elongated rectangular passage is formed by sides 16, 17, 20 and 21 adjacent their inner edges. A rectangular bar 22 fills this passage and the inner portions of sides 16, 17, 20 and 21 may be secured to bar 22 by soldering, welding, or any other conventional means. If desired, bar 22 may be dispensed with and the blades 10, 11, 12 and 13 may be secured directly to each other by soldering or welding. Use of bar 22 preferred, however, since it lends rigidity and strength to the gage and facilitates manufacture of the gage.

The widths of blades 10, 11, 12 and 13 are unequal so that the distances from the outer edge of one blade to the sides of the blades which are perpendicular to the one blade are also unequal. For example, the distance from edge 23 of blade 10 to side 16 of blade 11 may be ⅝ inch, while the distance from edge 23 to side 24 of blade 12 may be only $\frac{7}{16}$ inch. Similarly, the distances from edge 25 of blade 11 to sides 26 and 20 of blades 10 and 13, respectively, of edge 27 to sides 28 and 17 of blades 11 and 12, respectively, and of edge 29 to sides 30 and 21 of blades 13 and 10, respectively, are also unequal so that by proper manipulation of the gage, eight lines parallel to an edge of a work piece 31 and spaced from each other may be drawn on the top surface of work piece 31 by drawing a line along one of the edges 23, 25, 27 or 29 while an appropriate side 16, 17, 20, 21, 24, 26, 28 or 30 is held parallel to and against the edge of work piece 31. The blades 10, 11, 12 and 13 vary in thickness in order that the eight spaced lines may be drawn on work piece 31.

The blades 10, 11, 12 and 13 are provided with indicia 32 on both sides which are graduated along edges 23, 25, 27 and 29 in accordance with the ordinary scales for measurement. These indicia facilitate the location of points on a line parallel to an edge of a workpiece. One of the blades, for example, blade 10, may be provided with an aperture 33 by means of which the gage may be suspended on a pin when not in use.

Figure 2 illustrates a gage provided with six blades 34, 35, 36, 37, 38 and 39 which are secured to a hexagonal bar 40 and which are unequal in width. The gage illustrated in Figure 2 will obviously permit twelve lines to be drawn on the surface of a work piece 41 parallel to an edge 42 of the work piece 41 at spaced intervals from the edge 42. It will be apparent that the line drawn along the edge of one of the blades, say edge 43 of blade 34, from edge 42 of work piece 41 will vary with the thickness of the work piece 41. For this reason, the gage of Figure 2 is most appropriately employed where the work pieces are all of the same thickness. In the alternative, separate gages may be employed for work pieces 41 of different thicknesses. The gage illustrated in Figure 1, however, can be employed to lay off lines on workpieces of varying thicknesses since the blades are all either parallel or perpendicular to each other.

The gage illustrated in Figure 3 is provided with three blades 44, 45 and 46 which are of varying widths. The three blades are rigidly secured to each other in parallel juxtaposed relation with the blade 45 of greatest width interposed between the other two blades 44 and 46. The two blades 44 and 46 are asymmetrically positioned with respect to the side edges 47 and 48 of blade 45 so that the distances of the side edges 49, 50 and 51, 52 of the other blades 44 and 46 from the side edges 47 and 48 are unequal. As illustrated blade 44 is thicker than blade 46 in order that the gage may be employed to lay off six lines parallel to the edge of workpieces spaced at varying distances from the edge of the work piece.

While the gages illustrated in the drawing are formed of separate blades of hard metal to minimize wear of the surfaces against which the workpieces abut, the gages may be made of single integral pieces of plastic or other relatively soft material by extrusion or any other suitable process if the workpieces themselves are not of a substance of such hardness as would cause excessive wearing of the gages.

While I have described and illustrated preferred embodiments of my invention, it will be obvious that various changes and modifications can be made without departing from my invention and I, therefore, aim in the appended claims to cover all such changes and modifications as fall within the true spirit and scope of my invention.

What I claim as new and desire to secure by Letters Patent of the United States is:

1. A gage comprising a plurality of blades, each of said blades having a pair of edges and a pair of parallel sides, each of said blades having an edge abutting a side of an adjacent blade and having the opposite edge remote from said side of the adjacent blade, each of said blades having a side abutting an edge of another adjacent blade, the sides of each of said blades extending at an angle to the planes in which the sides of its adjacent blades are disposed.

2. The device of claim 1, the widths of said blades being unequal.

3. The device of claim 1, the sides of each blade adjacent said opposite edge being provided with graduated indicia.

4. A gage comprising four blades, each of said blades having a pair of edges and a pair of parallel sides, each of said blades having an edge abutting a side of an adjacent blade and having the opposite edge remote from said side of the adjacent blade, each of said blades having a side abutting an edge of another adjacent blade, the sides of each of said blades extending perpendicularly to the planes on which the sides of its adjacent blades are disposed.

5. The device of claim 4, the widths of said blades being unequal.

6. The device of claim 4, the sides of each blade being provided with graduated indicia.

7. A gage comprising a plurality of blades disposed in planes spaced about and lying parallel to a longitudinal axis, each of said blades extending at an angle to the sides of two adjacent blades, whereby the edge of each blade may be employed to lay off a line on the surface of a workpiece abutting one of said two sides.

8. The device of claim 7, the widths of said blades being unequal.

9. A gage comprising four blades disposed in planes spaced about and lying parallel to a longitudinal axis, each of said blades being perpendicular to the sides of two blades and parallel to the sides of a third blade, each blade extending away from said longitudinal axis and from the blade with which it is parallel.

10. The device of claim 9, said blades being of unequal widths.

References Cited in the file of this patent

UNITED STATES PATENTS

| Number | Name | Date |
|---|---|---|
| 73,082 | Darling | Jan. 7, 1868 |
| 834,872 | Collie et al. | Oct. 30, 1906 |
| 1,135,259 | Cokely | Apr. 13, 1915 |
| 1,732,906 | Morton | Oct. 22, 1929 |
| 2,215,499 | Glick | Sept. 24, 1940 |